2,816,124

PROCESS FOR PREPARING HEXAETHYLCYCLO-TRISILOXANE

Edward R. York, Tonawanda, N. Y., assignor to Union Carbide Corporation, a corporation of New York No Drawing. Application April 21, 1954,
Serial No. 424,747

4 Claims. (Cl. 260—448.2)

This invention relates to a process for preparing the cyclic trimer of diethylsiloxane namely, hexaethylcyclotrisiloxane. More particularly, the invention relates to a process for preparing essentially pure hexaethylcyclotrisiloxane from the cyclic tetramer of diethylsiloxane, octaethylcyclotetrasiloxane.

It is known that the industrially valuable diethylpolysiloxanes of relatively high molecular weight are prepared by processes which include the hydrolysis of diethyldichlorosilane to a hydrolyzate comprising a mixture of low molecular weight silanols and cyclic siloxanes and the subsequent treatment of such hydrolyzate to cause condensation of the silanols and rearrangement of the cyclic siloxanes to desirable polymeric products. In such processes, hydrolysis is generally effected by either the water-ice, water solvent, or water-solvent-ice techniques while condensation and rearrangement are effected by treatment with an acid or alkaline catalyst with or without the aid of heat.

Perhaps the outstanding difficulty attending the use of the above process for preparing relatively high molecular weight diethylpolysiloxanes lies in the inability to control the hydrolysis reaction to the extent that a uniformly reactive hydrolyzate is obtained. More specifically, the known methods of hydrolyzing diethyldichlorosilane lead to the preparation of a mixture of various components some of which are reactive and others of which are immune to conversion and rearrangement to higher polymers. For example, the low molecular weight silanols present readily condense intermolecularly to higher molecular weight polymers. On the other hand, the stable cyclic siloxanes which are present in appreciable portions are not, with the notable exception of the cyclic trimer, amenable to rearrangement to higher molecular weight polymers. Thus, substantial amounts of various cyclic siloxanes such as the cyclic tetramer, octaethylcyclotetrasiloxane, the cyclic pentameter, decaethylcyclopentasiloxane, and their higher homologues are found in the mixture with the high molecular weight polymers prepared by such processes. The presence of higher molecular weight cyclic siloxanes in admixture with diethylsiloxane polymer products such as diethyl oils and resins is particularly undesirable as such cyclic siloxanes are comparatively volatile and must be removed as otherwise they volatilize when the oil or resin is subjected to elevated temperatures.

Of the various components of a hydrolyzate prepared by the hydrolysis of diethyldichlorosilane, the cyclic trimer of diethylsiloxane is by far the most desirable. The compound is relatively stable on storage while at the same time it readily undergoes rearrangement to relatively high molecular weight polymers on treatment with an appropriate catalyst. Thus, the cyclic trimer does not possess the reactiveness of the silanol component of the hydrolyzate nor does it possess the extreme stability of the higher cyclic homologues also present in the hydrolyzate.

As the amount of the cyclic trimer of diethylsiloxane prepared by known hydrolysis procedures is comparatively small, considerable effort has been devoted toward finding new methods for its production in increased yields. However, thus far, no entirely satisfactory method for its production in substantial quantities has been proposed.

I am aware of the work of James Franklin Hyde as disclosed in U. S. Patents Nos. 2,438,478 and 2,455,999 where both the cyclic trimer and tetramer of dimethylsiloxane are prepared by the depolymerization of highly polymerized dimethyl silicones or by the depolymerization of a mixed hydrolyzate prepared by the hydrolysis of various methyl silicon chlorides which hydrolyzate comprises a copolymeric mixture containing mono-di- and tri- and unsubstituted silicon atoms. To depolymerize a highly polymerized dimethyl silicone into the cyclic trimer and tetramer of dimethylsiloxane, the process comprises heating the polymer to a temperature of at least 275° C. However, it is mentioned that during such depolymerization noticeable amounts of both mono-and unsubstituted silicon, if present, may also be carried over with the distillate. As stated in said patents, the distillation of such mono- and unsubstituted silicon in the process becomes more noticeable and hence objectionable when the method is applied to fresh hydrolysis products or incompletely condensed mixtures. To overcome this difficulty it was suggested that small amounts of sodium hydroxide be introduced into the polymer mixture before distillation. Although the process as disclosed by Hyde is effective to prepare both the cyclic trimer and tetramer of dimethylsiloxane it has not been shown effective for the preparation of a cyclic trimer and tetramer of diethylsiloxane.

It is known that the cyclic tetramer of diethylsiloxane is obtained in substantial quantities by the hydrolysis of diethyldichlorosilane and that such tetramer unlike its analogue in the methylsiloxane family is extremely stable. Its relative stability is indicated by noting that heretofore the compound has exhibited no appreciable tendency to rearrange to higher polymers and has no practical value as a starting material, per se, in the production of such polymers. In view of this stability, uses as thermostatic fluids or as heat and power transfer fluids have been suggested for the compound.

I have found that under limited, well-defined conditions the cyclic tetramer of diethylsiloxane may be essentially completely converted to the cyclic trimer of diethylsiloxane. The process of my invention comprises treating octaethylcyclotetrasiloxane with limited amounts of an alkaline-potassium catalyst at a temperature within the range of from about 150° C. to about 250° C. and preferably at a temperature from about 170° C. to 230° C. In the practice of my invention it is of particular importance that the reaction be conducted at temperatures below the maximum value set forth as otherwise it has been found that the yield of the cyclic trimer is substantially reduced and the product obtained is no longer the pure cyclic trimer but is instead, contaminated by the presence of other undesirable compounds. Apparently, at temperatures above about 250° C. side reactions occur which successfully compete with the conversion of the cyclic tetramer to the cyclic trimer.

The conversion of the cyclic tetramer to the cyclic trimer as effected by the invention may be illustrated as follows:

$$3[Et_2SiO]_4 \rightleftharpoons 4[Et_2SiO]_3$$

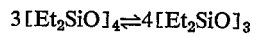

As disclosed in the above equation the reaction is in equilibrium and as far as is known the course thereof does not depart from well established laws and principles applicable to dynamic equilibrium and equilibrium concentrations. Thus, the point of equilibrium may be shifted in the direction of the cyclic trimer by decreasing the concentration of the product by distillation of the trimer. However, since the boiling point of hexaethylcyclotrisiloxane at atmospheric pressure is above the maximum permissible temperature at which the reaction may be conducted, it will be necessary to conduct the reaction under reduced pressures to permit the removal of the cyclic trimer by distillation.

The catalysts which are employed in the process of my invention are, as indicated above, alkaline-potassium catalysts and include such compounds as potassium hydroxide, potassium carbonate, potassium alcoholates, potassium silanolates and the like. In general, the catalysts are employed in such quantities as to insure a concentration of from about .05 to about 4.0 weight percent of potassium by weight of the siloxane. Potassium silanolate catalysts referred to above may be readily prepared by reacting potassium hydroxide with the cyclic trimer or tetramer of diethyl or dimethylsiloxane.

The cyclic tetramer starting material for the process of the invention may be readily obtained by various procedures. For example, the cyclic tetramer may be removed by distillation processes from a diethyldichlorosilane hydrolyzate or condensate. If desired the compound may be obtained in substantial quantities by the controlled hydrolysis of diethyldichlorosilane as disclosed in copending U. S. application Ser. No. 401,052 filed December 29, 1953 now U. S. Patent No. 2,769,829, in the name of D. C. Dobay and assigned to the same assignee. By conducting hydrolysis in accordance with procedures disclosed in the above mentioned copending application, essentially all of the diethyldichlorosilane is converted to the cyclic tetramer of diethylsiloxane. As the instant invention makes possible essentially complete conversion of the cyclic tetramer to the cyclic trimer a process now becomes available whereby diethyldichlorosilane may be directly converted to the cyclic trimer of diethylsiloxane, without encountering the disadvantages attending the use of presently known processes.

A preferred method for conducting the process of the invention consists of charging the cyclic tetramer and catalyst to a flask connected to a fractionation column adapted to operate at reduced pressures. The contents of the flask are then heated under reduced pressure to cause refluxing at a temperature within the range set forth above and the cyclic trimer distilled therefrom. If desired, the process may be made continuous by providing means, such as a dropping funnel, for the charging of additional cyclic tetramer to the flask during the removal of the cyclic trimer. It will not be necessary to add more catalysts as I have found that the alkaline-potassium compounds do not lose their catalytic capacity by the reaction and therefore so long as the concentration of potassium in the flask is maintained within the defined limits, the conversion of the cyclic tetramer to the cyclic trimer proceeds without difficulty.

The present invention may be further illustrated by the following examples.

*Example I*

To a three-neck, round bottom, one liter flask equipped with a dropping funnel, thermometer and a 10-plate distillation column were added 500 grams of crude diethylsiloxane cyclic tetramer containing approximately 85% by weight of octaethylcyclotetrasiloxane and approximately 10% by weight of hexaethylcyclotrisiloxane, and 5 grams of potassium hydroxide (0.70 weight percent potassium). The contents of the flask were heated to a temperature of about 230° C. at 100 mm. Hg absolute pressure. Removal of the cyclic trimer from the column head was established at 80 grams per hour at a head temperature of 188° C. with a 4:1 reflux ratio. Once these conditions were obtained additional cyclic tetramer was continuously charged to the flask by means of the dropping funnel and the conditions above maintained over a period during which time 5,692 grams of the cyclic tetramer were treated and yield of 5,341 grams of the cyclic trimer were obtained.

*Example II*

To a three-neck, round bottom, one liter flask equipped with a dropping funnel, thermometer and a 10-plate distillation column were added 500 grams of crude diethylsiloxane cyclic tetramer containing approximately 85% by weight of octaethylcyclotetrasiloxane and approximately 10% by weight of hexaethylcyclotrisiloxane and 5 grams of potassium hydroxide (0.7 weight percent potassium). The contents of the flask were heated to a temperature of 250° C. at 150 mm. Hg absolute pressure. Removal of the cyclic trimer from the column head was established at 100 grams per hour at a head temperature of 193° C. Once these conditions were obtained additional cyclic tetramer was continuously charged to the flask by means of the dropping funnel and the conditions above maintained over a period during which time 2000 grams of the cyclic tetramer were treated and a yield of 1809 grams of the cyclic trimer was obtained.

*Example III*

To a three-neck, round bottom, one liter flask equipped with a dropping funnel, thermometer and a fractionating column packed with ⅛" glass helices were added 778 grams of octaethylcyclotetrasiloxane and 10 grams of potassium hydroxide slurried in one ml. of water (1.3 weight percent potassium). The contents of the flask were heated to a temperature of 200–205° C. under a reduced pressure of 20 mm. Hg absolute under which conditions reflux occurred in the head of the fractionating column at a temperature of about 150–160° C. In the next 7½ hour period a total of 440 grams of cyclic trimer were recovered.

It is noted that the conversion of the cyclic tetramer to the cyclic trimer is readily affected only under conditions wherein an alkaline-potassium catalyst is employed at temperatures in the range of from about 150° C. to about 250° C. The use of other compounds as catalysts for the process of the invention such as the remaining members of the alkaline class have not proven entirely satisfactory. For example, lithium hydroxide was found non-catalytic while sodium hydroxide was found catalytic, to some extent, only at higher temperatures where side reactions become quite noticeable. Such side reactions result in the production of a multi-component product which has only limited usefulness.

What is claimed is:

1. An improved process for preparing hexaethylcyclotrisiloxane which comprises heating octaethylcyclotetrasiloxane in the presence of an alkaline-potassium catalyst to a temperature of from about 150° C. to about 250° C. and distilling hexaethylcyclotrisiloxane under a reduced pressure.

2. An improved process for preparing hexaethylcyclotrisiloxane which comprises heating octaethylcyclotetrasiloxane in the presence of an alkaline-potassium catalyst, in an amount such as to obtain a concentration of from about 0.5 to about 4.0 weight percent of potassium by weight of said octaethylcyclotetrasiloxane, to a temperature of from about 150° C. to about 250° C. and distilling hexaethylcyclotrisiloxane under a reduced pressure.

3. An improved process for preparing hexaethylcyclotrisiloxane which comprises heating octaethylcyclotetrasiloxane in the presence of potassium hydroxide to a temperature of from about 150° C. to about 250° C. and distilling hexaethylcyclotrisiloxane under a reduced pressure.

4. An improved process for preparing hexaethylcyclotrisiloxane which comprises heating octaethylcyclotetrasiloxane in the presence of potassium hydroxide, in an amount such as to obtain a concentration of from about 0.5 to about 4.0 weight percent of potassium by weight of said octaethylcyclotetrasiloxane, to a temperature of from about 150° C. to about 250° C. and distilling hexaethylcyclotrisiloxane under a reduced pressure.

References Cited in the file of this patent

UNITED STATES PATENTS

| 2,455,999 | Hyde | Dec. 14, 1948 |
| 2,490,357 | Hyde | Dec. 6, 1949 |
| 2,495,363 | Barry et al. | Jan. 24, 1950 |

OTHER REFERENCES

Hunter et al.: "Jour. Am. Chem. Soc.," vol. 68 (1946), pages 667–672.